United States Patent [19]
Rudolph

[11] Patent Number: 5,039,032
[45] Date of Patent: Aug. 13, 1991

[54] HIGH TAPER WING TIP EXTENSION

[75] Inventor: Peter K. C. Rudolph, Seattle, Wash.

[73] Assignee: The Boeing Company, Seattle, Wash.

[21] Appl. No.: 354,165

[22] Filed: May 19, 1989

Related U.S. Application Data

[63] Continuation-in-part of Ser. No. 268,647, Nov. 7, 1988, abandoned, which is a continuation of Ser. No. 920,017, Oct. 17, 1986, abandoned.

[51] Int. Cl.$^5$ .............................................. B64C 3/10
[52] U.S. Cl. ................................. 244/35 R; 244/124; 244/35 A; 244/45 R
[58] Field of Search ............. 244/119, 218, 210, 35 R, 244/124, 35 A, 45 R

[56] References Cited

U.S. PATENT DOCUMENTS

| | | | |
|---|---|---|---|
| 1,518,621 | 12/1924 | Wenk | 244/35 |
| 1,982,242 | 11/1934 | Bellanca | 244/218 |
| 2,361,574 | 10/1944 | Tampier | 244/42 |
| 2,375,423 | 5/1945 | Lobelle | 244/43 |
| 2,537,369 | 1/1951 | Ostroff | 244/135 |
| 3,310,262 | 3/1967 | Robins et al. | 244/45 |
| 3,438,597 | 4/1969 | Kasper | 244/13 |
| 3,904,152 | 9/1975 | Hill | 244/43 |
| 4,132,375 | 1/1979 | Lamar | 244/90 |
| 4,240,597 | 12/1980 | Ellis et al. | 244/35 |
| 4,700,911 | 10/1987 | Zimmer | 244/35 |

FOREIGN PATENT DOCUMENTS 516485  2/1955  Italy ................................. 244/218

OTHER PUBLICATIONS

SAE Technical Paper 851770, "Swept Wing-Tip Shapes for Low-Speed Airplanes", by C. P. van Dam, Oct. 14–17, 1985.
NASA Technical Paper 1020, "Theoretical Parametric Study of the Relative Advantages of Winglets and Wing-Tip Extensions", by Harry H. Heyson et al., 1977.
Aviation Week & Space Technology, pp. 65–67, "Dornier Expects Extensive Sensing, Surveillance Demand for DO 228", by Michael Feazel, Sep. 9, 1985.
Aviation Week, pp. 30–33, "Theory of the Inversely Tapered Wing", by Robert McLarren, Mar. 21, 1949.

*Primary Examiner*—Joseph F. Peters, Jr.
*Assistant Examiner*—Anne E. Bidwell
*Attorney, Agent, or Firm*—William C. Anderson; B. A. Donahue

[57] ABSTRACT

A highly tapered wing tip extension added to the tip of an existing swept, trapezoidal airplane wing for reducing high speed drag significantly. A smaller, highly swept, extension does not require a leading edge device to protect against low speed stall. A larger, less swept, extension requires a tapered slat for which two mechanisms are presented. The principles of the present invention are also applicable to the design of new aircraft.

29 Claims, 8 Drawing Sheets

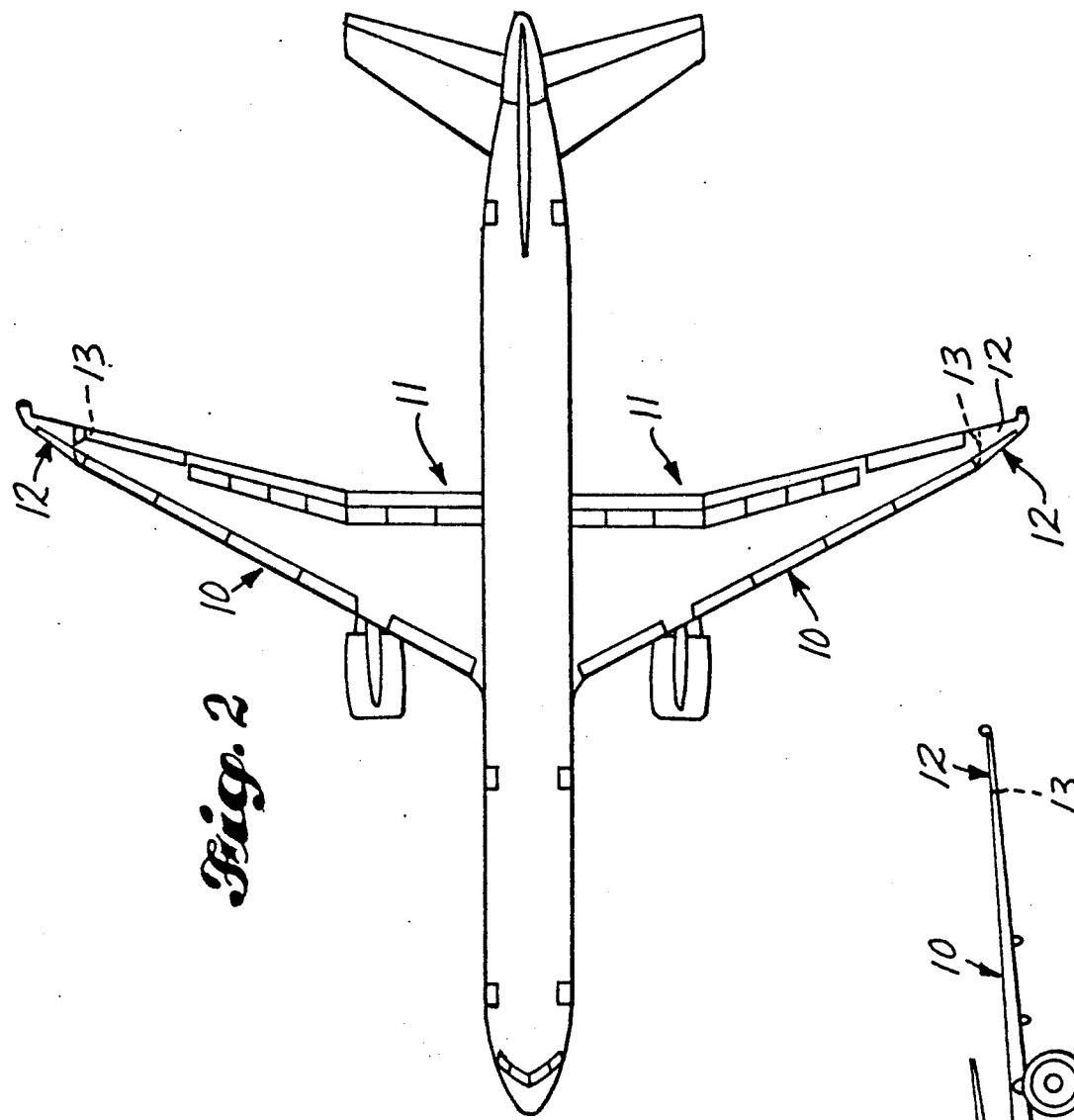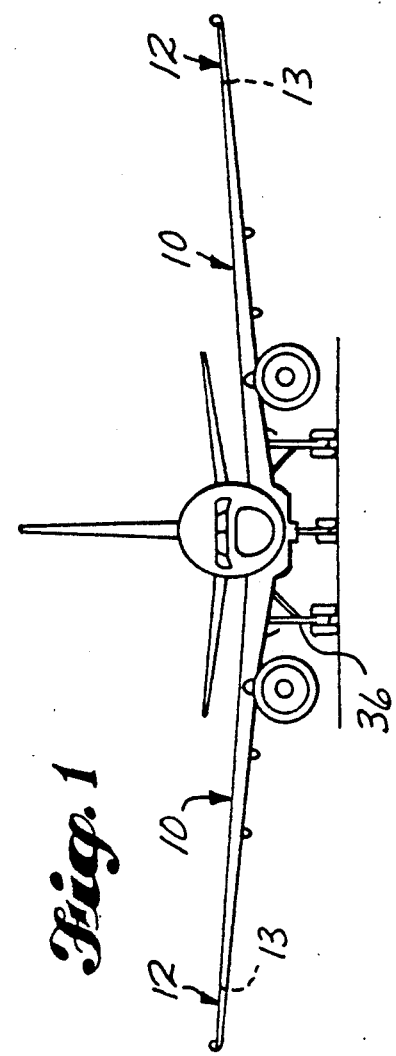

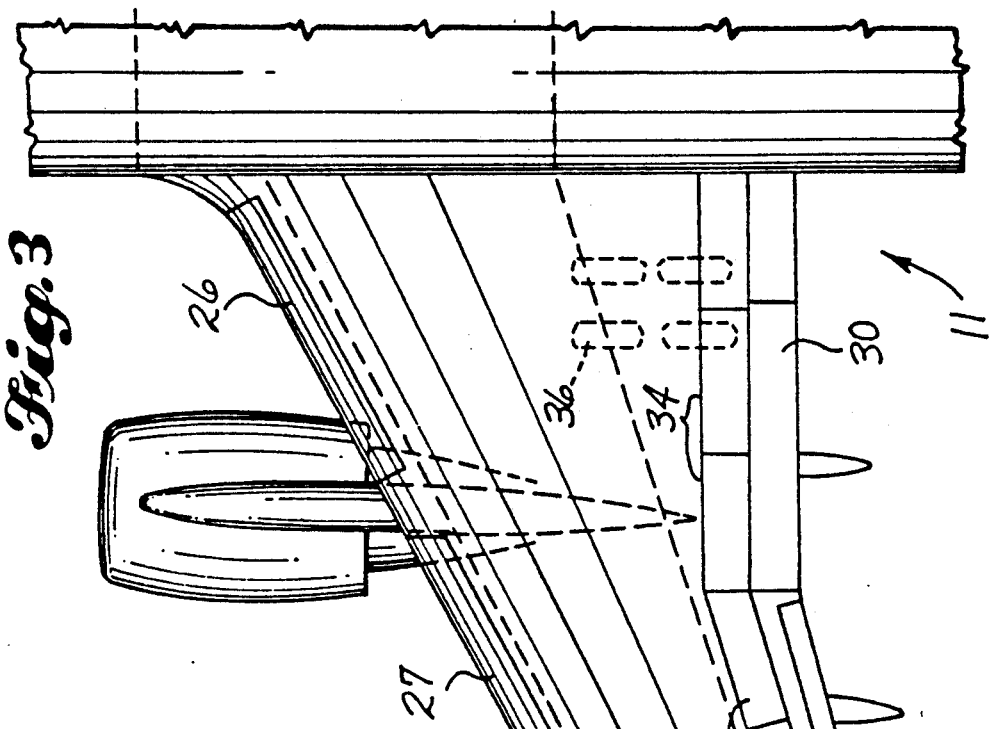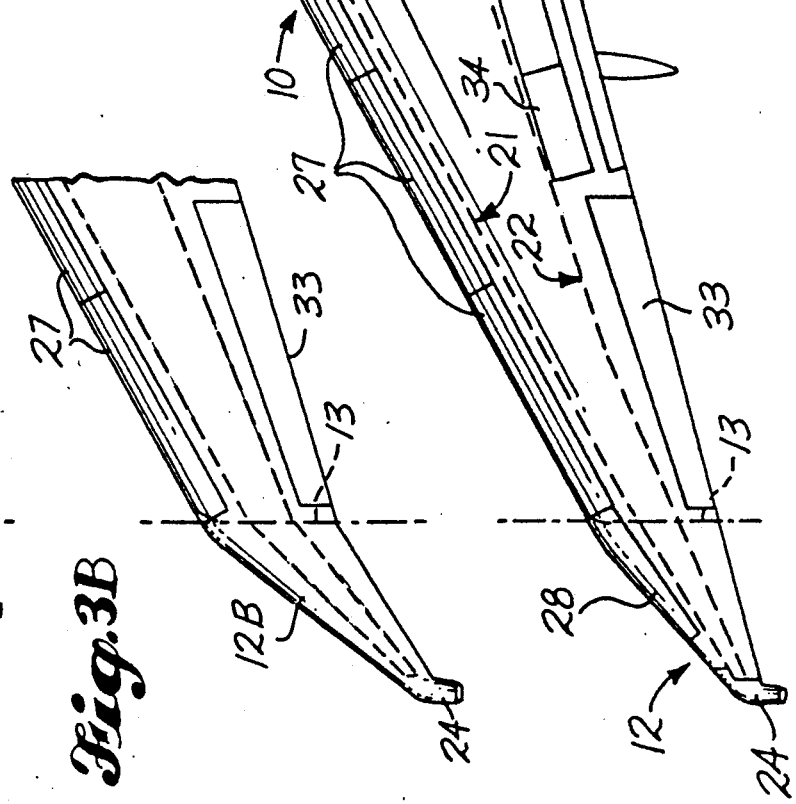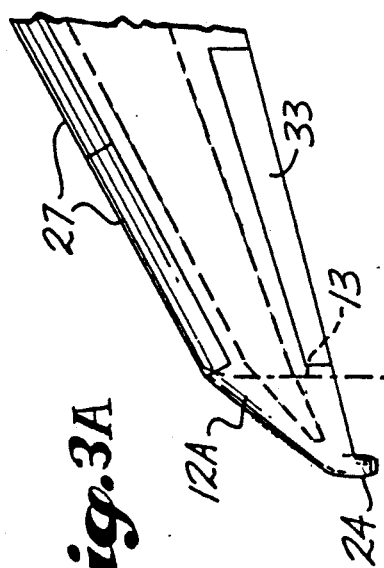

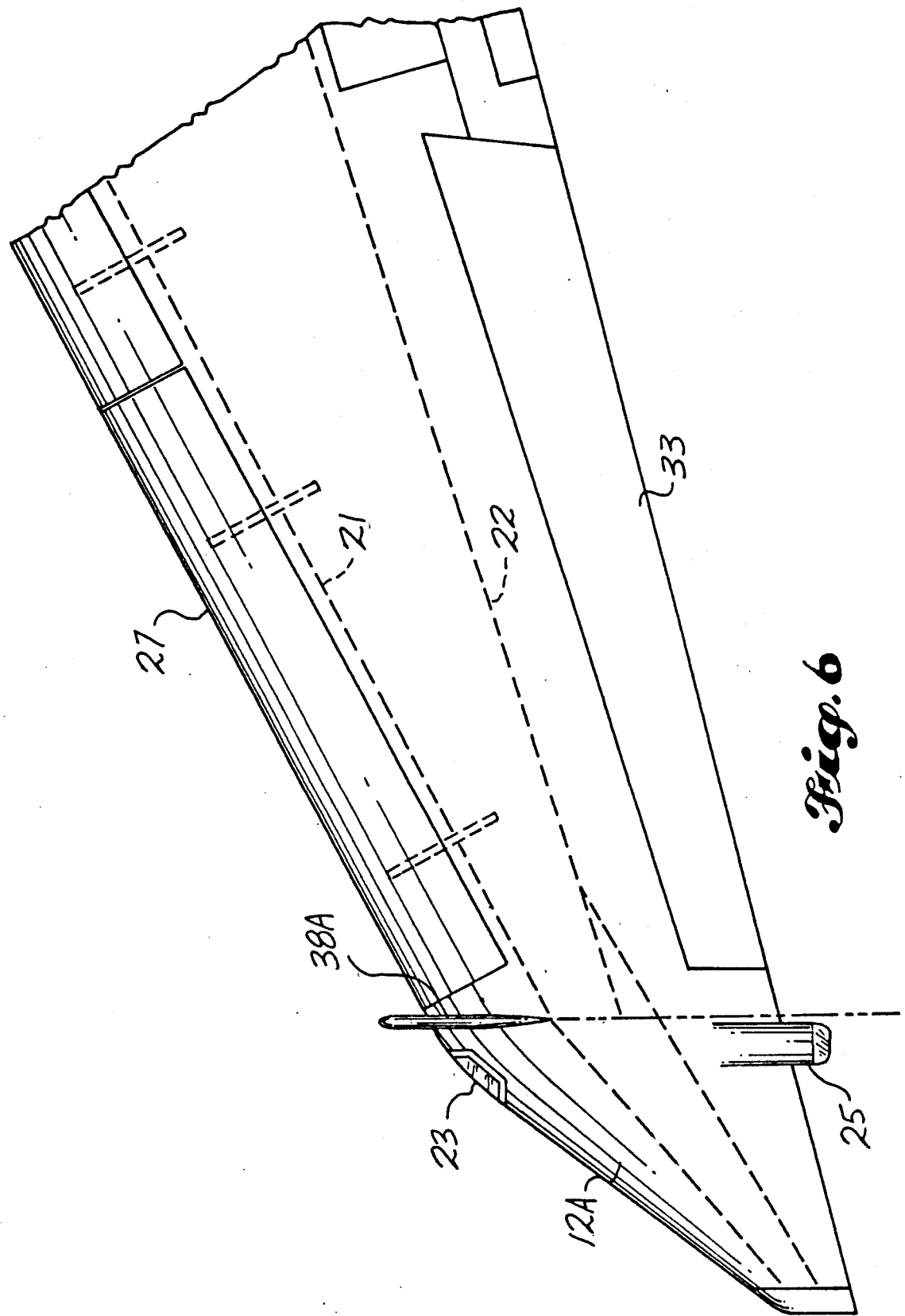

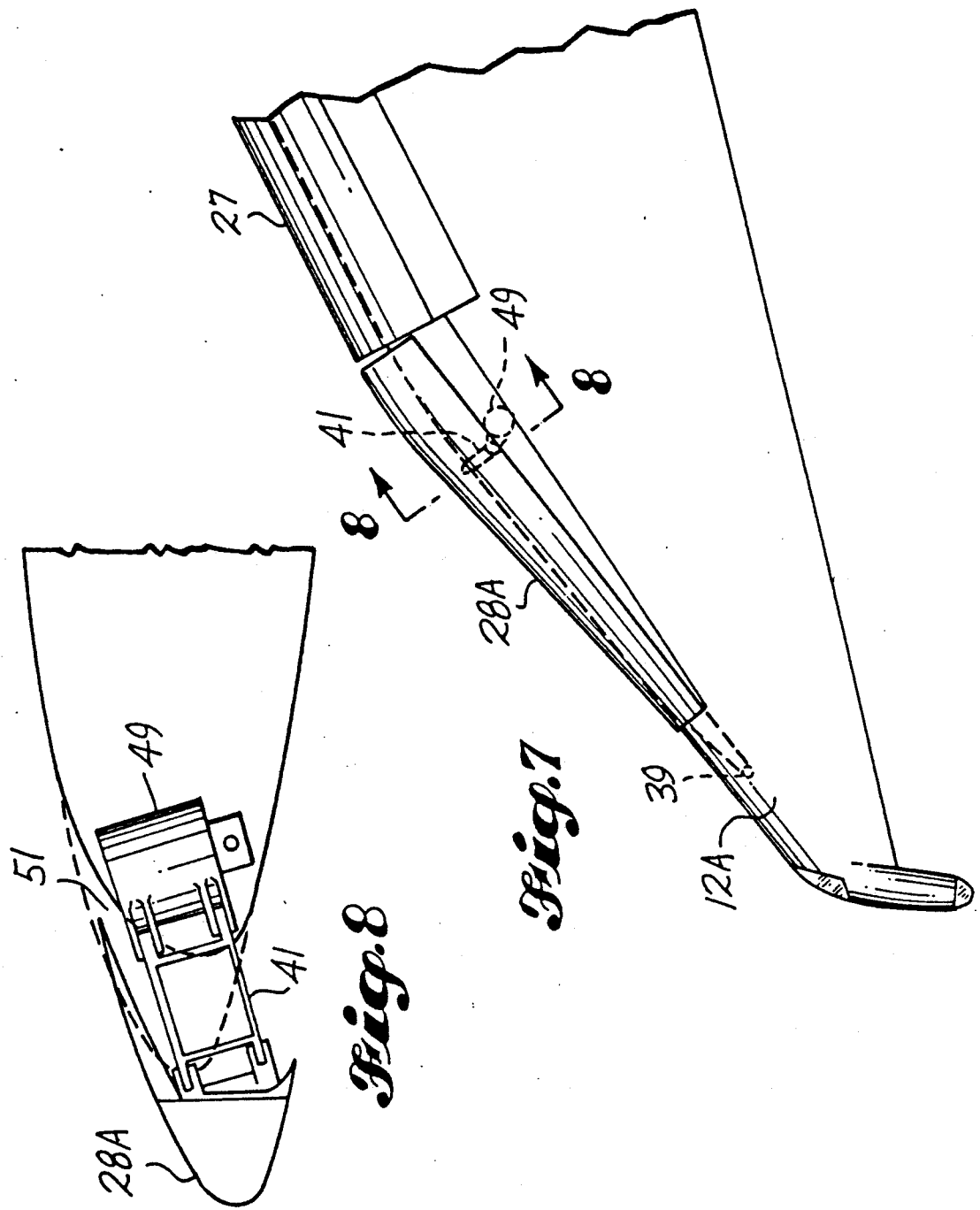

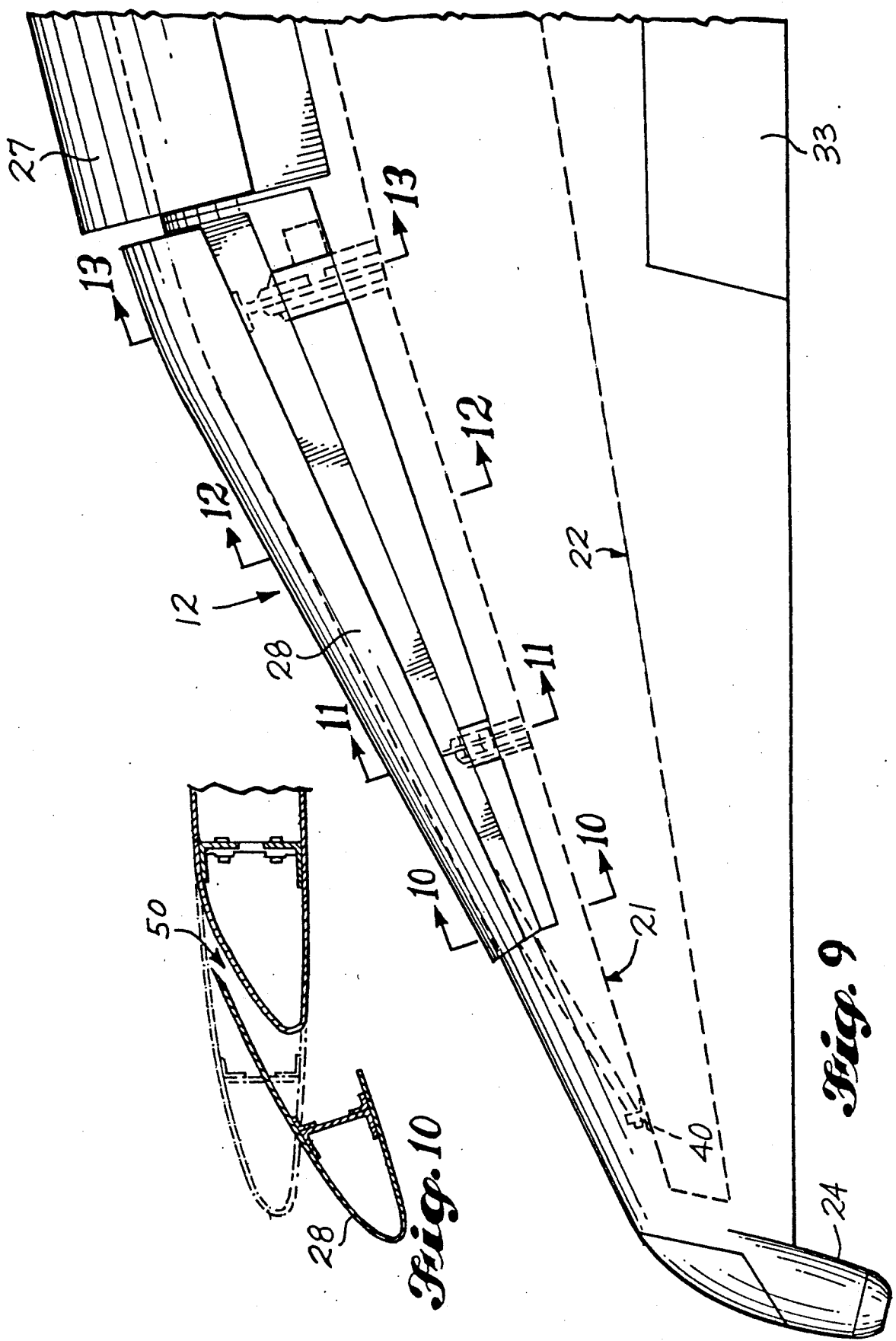

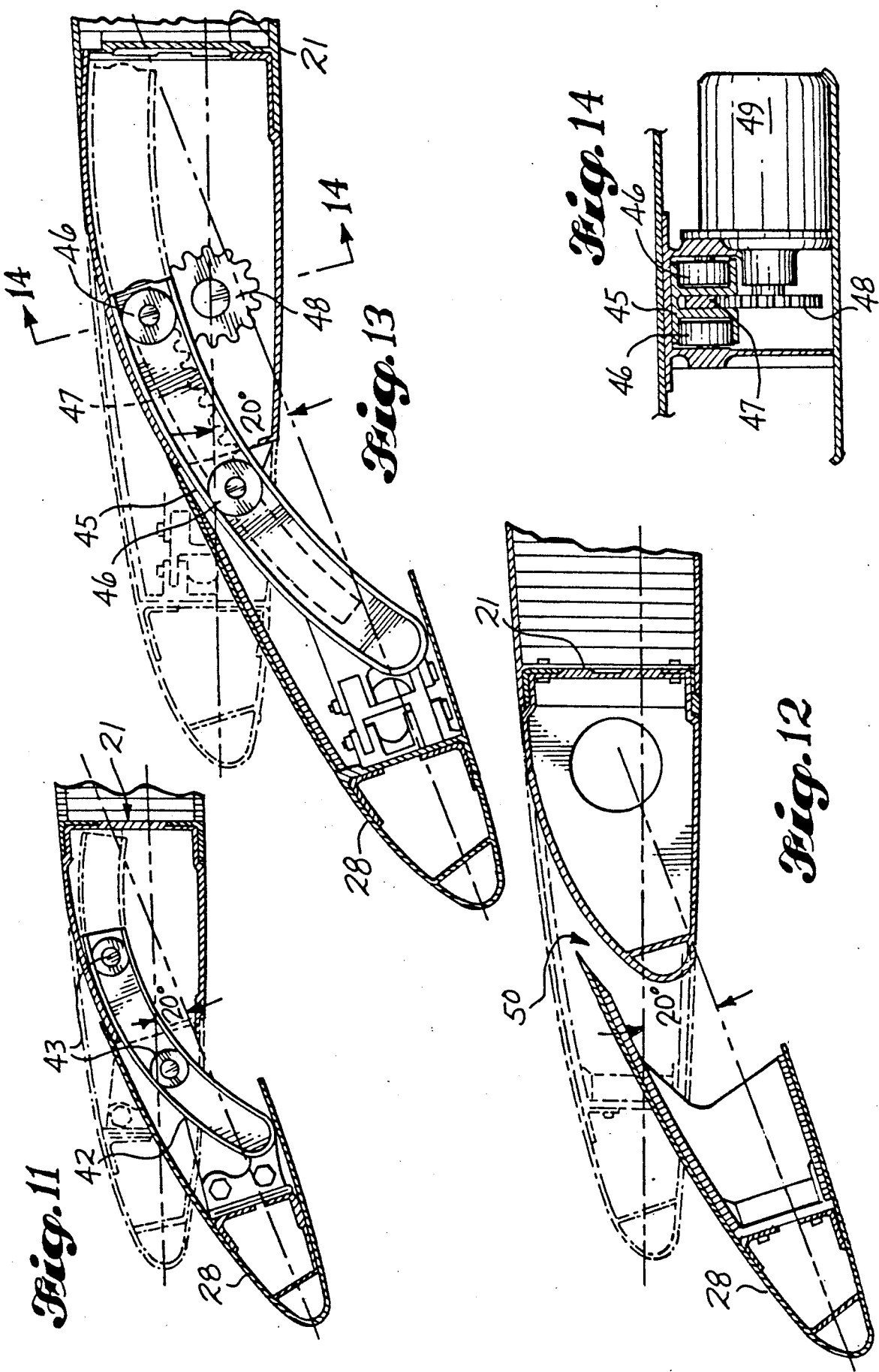

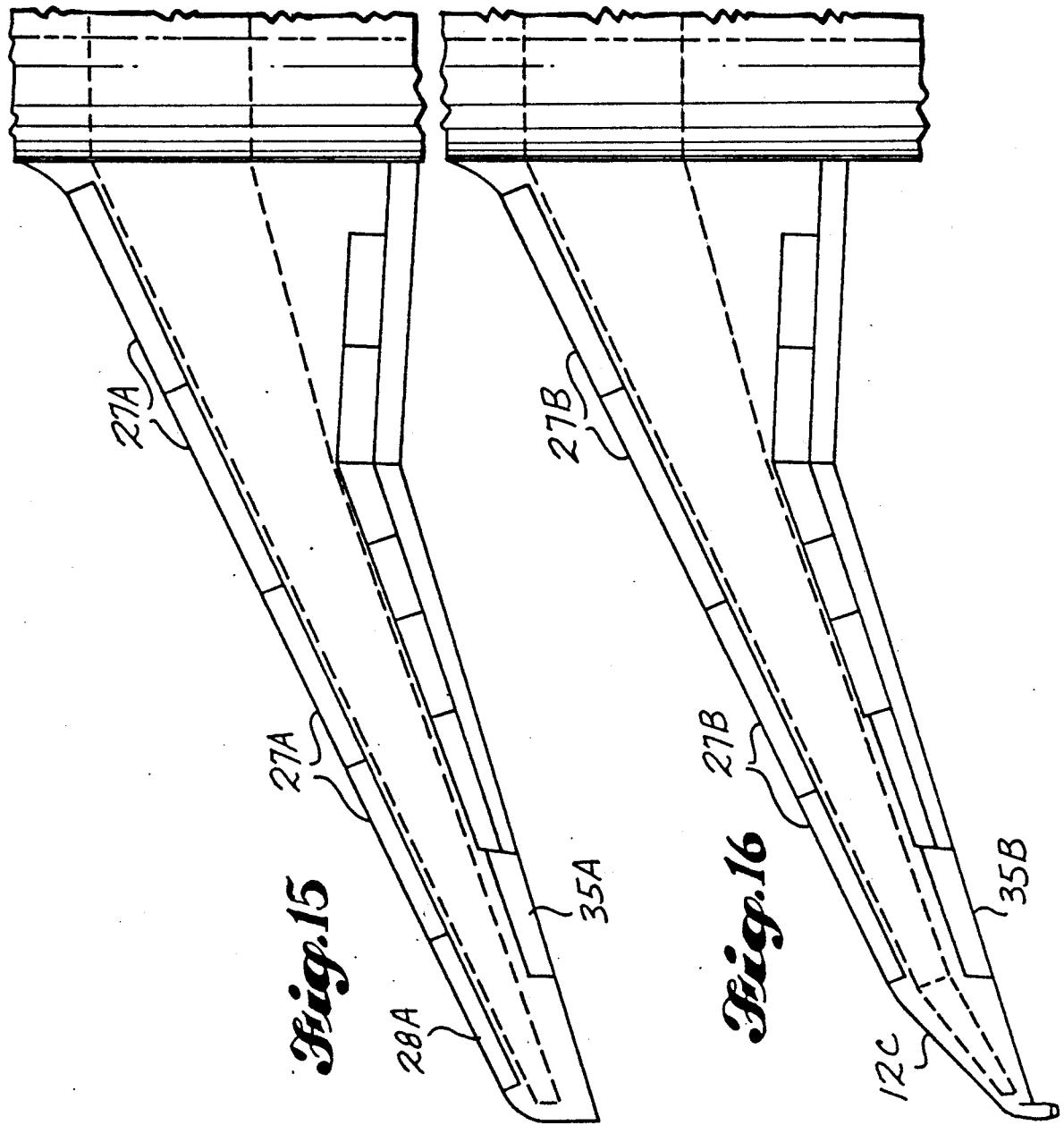

HIGH TAPER WING TIP EXTENSION

CROSS REFERENCE TO RELATED APPLICATIONS

This is a continuation-in-part of U.S. Pat. Application Ser. No. 07/268,647 filed Nov. 7, 1988, and now abandoned, which was a continuation of U.S. Pat. Application Ser. No. 06/920,017, filed Oct. 17, 1986, and now abandoned.

BACKGROUND OF THE INVENTION

The aerodynamic performance of an airplane, at both low airspeed and high airspeed improves with an increase in aspect ratio (span$^2$/wing area) of the lifting surfaces, e.g., the main wing of the airplane. Theoretically, for a given lifting surface, the aerodynamic drag of the lifting surface and the airplane is reduced as the span of the lifting surface is increased. Therefore, a lifting surface with the lowest aerodynamic drag should have a long span and a relatively short chord. High-performance sailplanes are examples of aircraft having similar high aspect ratio lifting surfaces.

Commercial airline type airplanes have lifting surfaces which are designed for high airspeed flight of about Mach 0.8 and at much higher lifting surface area loading than high performance sailplanes. To achieve the high speed capability, the lifting surfaces are generally swept and the airfoil sections are thin. Since the lifting surfaces are highly loaded, the span has to be limited to accommodate the wing bending loads. To achieve a significant drag reduction on a commercial airplane already in production requires an increase in aspect ratio, i.e., an increase in span. Any span increase causes increased bending moments on the existing wing and requires an increase in the structural strength of the existing wing box. This strengthening can only be accomplished by increasing the structural thickness of the wing box members, such as skins, stringers, and spars.

A first approach for increasing the aspect ratio of a trapezoidal swept main wing of an airplane is to add a wing tip extension member to the outboard ends of the main wing. In this approach, the leading and trailing edges of each wing tip extension member is in alignment with the leading and trailing edges of the tapered main wing. The convergence of leading and trailing edges reduces the airfoil chord of the wing tip extension member. As a consequence, there is inadequate space for installing high-lift leading edge devices such as slats or flaps, known in the trade as "Krueger" flaps. The absence of a leading edge device on a wing tip extension member could produce undesirable effects, such as premature stall, on the wing tip extension member. This stall condition could further induce stall progression into the main wing thereby causing buffet, roll-off, and pitch-up of the airplane during low speed flight.

A second approach also uses wing tip extension members. In this case, however, each wing tip extension member has a leading edge in alignment with the leading edge of the swept main wing and a trailing edge whose sweep angle is greater than the sweep angle of the trailing edge of the main wing. This wing tip extension member has a larger tip chord than the tip extension of the first approach. Consequently, high-lift devices may advantageously be installed within each wing tip extension member. However, this second approach adds a relatively large incremental wing area to the basic wing area for a relatively modest increase in the overall aspect ratio of the main wing.

The increased area of the wing tip extension member of the second approach compared to the increased area provided by the first approach has other disadvantages, including a relatively large increase in: (1) weight, (2) aerodynamic friction drag, and (3) aerodynamic airloads on the extension members during gusts. The increase in aerodynamic airloads causes high wing bending moments requiring significant structural redesign and strengthening of the basic wing box from the root section of the main wing to the outboard section of the wing tip extension member.

A third approach for theoretically increasing the aspect ratio of a sweptback tapered main wing is the use of end plates or wing tip fins to significantly reduce wing tip vortices and the drag induced thereby. The wing tip fins are generally positioned vertically or at slight cant angles to the main wing chord plane. Their resultant lifting force is essentially sideways which can affect the yaw characteristics of a main wing. However, there are also wing tip fins that are positioned at a substantial outward cant angle where both side forces and vertical lifting forces are developed. Regardless of the angular position of a wing tip fin, an increase in lift is induced on the main wing surface immediately inboard of the fin.

An advantage of wing tip fins is that any increase in wing bending moments is generally less than the wing bending moments produced by wing tip extensions in the same chord plane as the main wing. This is due to the fact that the added lift generated on the main wing by the wing tip fins occurs further inboard than the added lift produced by wing tip extension members.

A disadvantage to the use of wing tip fins is that more wetted area is required, relative to the above-described wing tip extension members, to achieve a similar percentage reduction in induced drag. Also, analysis of the wing elastic characteristics indicates that wing tip fins of large size can cause wing flutter. The sharp corner formed at the intersection of a vertical wing tip fin and the main wing can cause additional aerodynamic problems, such as the formation of shock wave induced separation of the boundary layer airflow over the upper surface of the main wing immediately inboard of the fin thereby causing an early drag rise in that location. Finally, the sharp corner causes high local stresses requiring heavy machined forgings at the juncture of the wing tip fin and the main wing. These forgings are generally attached to the main wing spars by large bolts which makes the corner joint heavy and expensive.

SUMMARY OF THE INVENTION

The invention relates to modifying the main wing of a conventional airline passenger type airplane by adding a highly tapered wing tip extension member to a basic sweptback main wing. This increases wing span and aspect ratio with a minimum of wetted area increase. The wing tip extension member, in conjunction with a change in camber at the very tip of the existing wing, permits a tailoring of the spanwise lift distribution to an almost elliptical shape. These four factors: span increase, aspect ratio increase, elliptical lift distribution, and small planform area change, provide for a large reduction in wing induced drag with a minimum increase in skin friction drag.

The preferred wing tip extension member of the present invention has a relatively modest span increase, a small tip chord, a high leading edge sweep, and a trailing edge in alignment with the main wing trailing edge. This small tip extension will not need a leading edge high-lift device because the highly swept leading edge triggers a stable vortex at low speed, high angle of attack operation. This offers a solution for increasing the aerodynamic efficiency of existing airplanes at low cost since the add-on tip member is simple and the changes to the basic wing box are small.

For tip extension members having a higher span providing a higher reduction in drag, the trailing edge of the extension member can be swept beyond the sweep of the basic (main) wing trailing edge to provide higher leading edge sweep and thus avoid the need for a leading edge device.

For tip extension members with higher span and moderate sweep, where a leading edge device is required, two different mechanisms deploying highly tapered slats on the high taper tip extension are disclosed. The first mechanism has an outboard hinge and a linkage with rotary hinge inboard. The second mechanism droops the slat by means of circular arc tracks.

The present invention also provides a wing tip light pod for position and anticollision lights not capable of fitting within the very small tip chord of the wing tip extension member.

On new airplanes, the principles of the present invention can be used to reduce wing area, skin friction drag, and structural weight. A main wing having a high taper wing tip may allow deletion of one slat per side and will reduce gust loads.

BRIEF DESCRIPTION OF THE DRAWINGS

FIG. 1 is a front elevational view of an airplane incorporating the wing tip extension member of the present invention in chordwise alignment with the main wing reference chord plane.

FIG. 2 is a top plan view of the airplane and shows a trapezoidal main wing and a wing tip extension member having a highly sweptback leading edge.

FIG. 3 is an enlarged top plan view of the left wing semispan of the airplane of FIGS. 1 and 2 and depicts more clearly the present wing tip extension member and the leading edge devices on the main wing.

FIG. 3A is a plan view of a smaller wing tip extension member having no leading edge device.

FIG. 3B is a plan view of a tip extension member having the same semispan as the member shown in FIG. 3, but with higher sweep and having no leading edge device.

FIG. 6 is an enlarged top plan view of a small wing tip extension member similar to the one shown in FIG. 3A and having a leading edge fence.

FIG. 7 is an enlarged top plan view of the left outboard highly tapered wing tip extension of FIG. 3 incorporating a conical slat with a linkage support system.

FIG. 8 is a cross-sectional view taken in the direction indicated by line 8—8 of FIG. 7, showing the leading edge slat in an extended position at the linkage and actuation location.

FIG. 9 is an enlarged top plan view of the left outboard wing tip extension of FIG. 3 incorporating a conical slat with a track support system.

FIG. 10 is a cross-sectional view taken in the direction indicated by line 10—10 of FIG. 9 showing the leading edge slat segment in an extended and downward deflected position whereby an aerodynamic slot is formed.

FIG. 11 is a chordwise cross-sectional view taken in the direction indicated by line 11—11 of FIG. 9 showing a curved roller support track for the leading edge slat segment.

FIG. 12 is a cross-sectional view taken in the direction indicated by line 12—12 of FIG. 9 and more clearly shows the aerodynamic slot formed when the slat segment is at the extended and downward deflected position.

FIG. 13 is a cross-sectional view taken in the direction indicated by line 13—13 of FIG. 9 showing a curved roller support track including a similarly curved rack gear with engaging pinion gear drive means.

FIG. 14 is a cross-sectional view taken in the direction indicated by line 14—14 of FIG. 13 and more clearly shows in cross-section the track, rollers, rack gear and pinion with rotary actuator.

FIG. 15 shows a portion of a possible new airplane having a high aspect ratio, trapezoidal, swept main wing.

FIG. 16 shows a wing of a semispan equal to the wing of FIG. 15 but having a highly tapered tip in accordance with the present invention.

DESCRIPTION OF THE PREFERRED EMBODIMENTS

Figure 4:
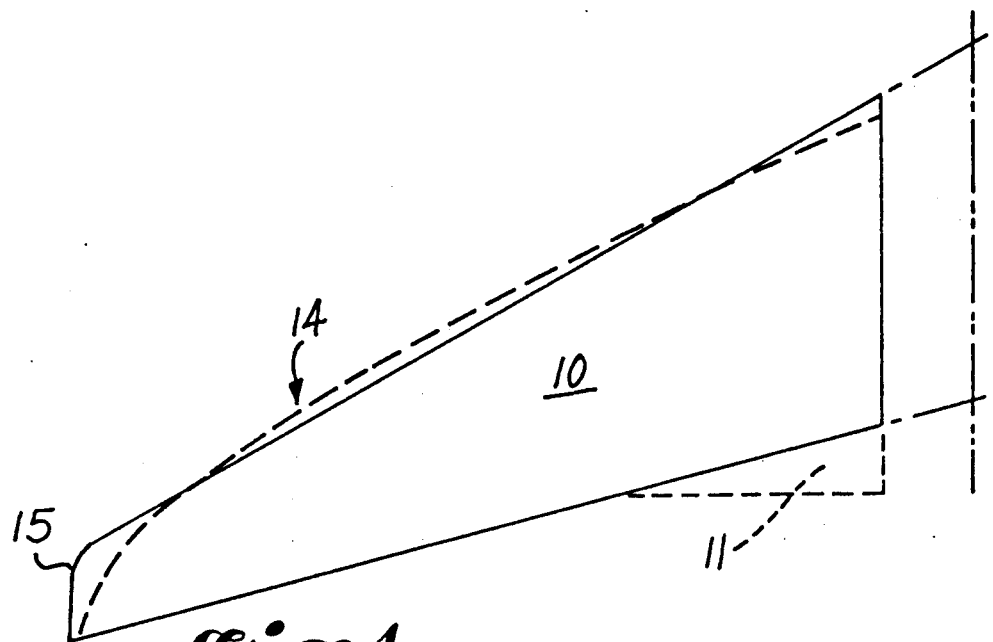
FIG. 4 shows the deviation of a conventional swept and tapered wing from an ellipse.

FIGS. 1 and 2 are front elevational and top plan views respectively of a high speed, twin-engined, turbofan, commercial passenger airplane. The airplane comprises a sweptback, tapered main wing 10 with a leading edge sweep of over twenty-seven degrees (27°), an inboard trailing edge section 11, known in the trade as a "Yehudi" section, and an outboard, more highly tapered, wing tip extension member 12 of the present invention.

In FIG. 3, the member 12 is shown as extending the main wing 10 by about twelve percent (12%) of semispan and having a chord plane in spanwise alignment with the main wing reference chord plane. The wing tip extension member 12 has a leading edge that is more sweptback than the leading edge of the main wing, i.e., about forty degrees (40°) or more, and a trailing edge in alignment with the trailing edge of the wing 10. In contrast, the tip extension member of FIGS. 3A and 6 has a semispan increase of about half of the extension member shown in FIG. 3, or about six percent (6%) of semispan of the main wing 10. Further, the leading edge sweep of the tip extension member of FIGS. 3A and 6 is near sixty degrees (60°) FIG. 3B shows yet another tip extension member having the same semispan as the tip extension of FIG. 3, but this extension member achieves the same leading edge sweep as the extension of FIG. 3A (nearly 60°) by shearing the tip extension aft.

Referring now to FIGS. 1 to 3, the wing 10 between the left and right wing tips is formed by a unitary structure comprising a center wing box, a left wing box, and a right wing box. The center wing box comprises a front spar and a rear spar enclosed within the fuselage section of the airplane. The left and right wing boxes are similar in structure, i.e., they comprise a front spar 21, a rear spar 22, and upper and lower skin panels.

The thickness and chord of each semispan wing tapers down towards the wing tip of the main wing 10. In plan view, the wing 10 of the present invention has a leading edge sweepback angle of about twenty-seven degrees (27°) and the wing tip extension member 12 has a greater leading edge sweepback angle.

The wing high-lift and control surface system is conventional and comprises leading edge slats including one inboard slat 26 between the side of the body and the engine, and four outboard leading edge slats 27 installed along the outboard section of the main wing 10. A single, conically extending, leading edge slat 28 is positioned along the wing tip extension member 12 of FIG. 3, but there are no tip slats provided in the wing tip extension members 12A and 12B illustrated in FIGS. 3A and 3B, respectively. As is conventional, the leading edge slat systems are structurally supported forward of the wing front spar 21.

A wing trailing edge high-lift system is also provided comprising double-slotted flaps 30 in the "Yehudi" section 11 (inboard flaps) and double-slotted flaps 31 outboard thereof (outboard flaps). The inboard flaps 30 and the outboard flaps 31 are cantilevered aft from the wing rear spar 22.

Also cantilevered aft from the wing rear spar 22 are outboard aileron control surfaces 33 and six (6) spoilers 34. A landing gear 36 is attached to and retractable within the "Yehudi" section 11.

When adding a wing tip extension member 12 of the present invention to an existing wing, portions of the wing 10 adjacent to the extension 12, and for some spanwise distance inboard thereof, may have to be modified to maximize the aerodynamic benefits from the add-on wing tip extension. This modification will generally comprise (i) a reduction of the basic wing tip washout or twist, (ii) an increase in the airfoil camber of the basic wing tip section, and (iii) down-rigging or twisting of the outboard ailerons 33 to increase the basic wing tip lift coefficients. By modifying the wing section lift coefficients on the existing main wing the aerodynamic benefits from the add-on wing tip extension member 12 can be maximized, i.e., approximating the spanwise lift distribution of an elliptical planform wing as closely as possible.

Structural changes to the wing box are required to accommodate the increased wing bending moments due to lift on the tip extension member 12. These changes may include increasing gauges on wing skins, stringers, and spars or a lengthening aft of the outboard wing box.

As stated earlier, the aerodynamic performance of a wing improves with increasing span. The improvement is due to a reduction in induced drag. For a given wing, any increase in wing span due to a tip extension member will reduce induced drag. However, the area increase associated with the tip extension member will cause increased skin friction drag and reduce the gains from a reduction in induced drag. This suggests that the largest span increase with the smallest wetted area increase might be the optimum solution, i.e., a triangular tip should be the optimum. However, aerodynamic theory also teaches that the optimum spanwise lift distribution for a wing with finite span is elliptical.

As shown in FIG. 4, the commonly known trapezoidal wing planform differs grossly from an ellipse. There is excess planform area 15 at the wing tip and in the area of the inboard "Yehudi" section 11. Wings are generally twisted to approximate the ideal elliptical spanwise lift distribution. Twisting requires that the local sectional lift coefficient is reduced inboard and the outer extremity of the wing tip is provided with reduced camber or incidence angle. This means that the low sectional lift coefficient inboard and at the tip underutilizes the local chord length.

Figure 5:
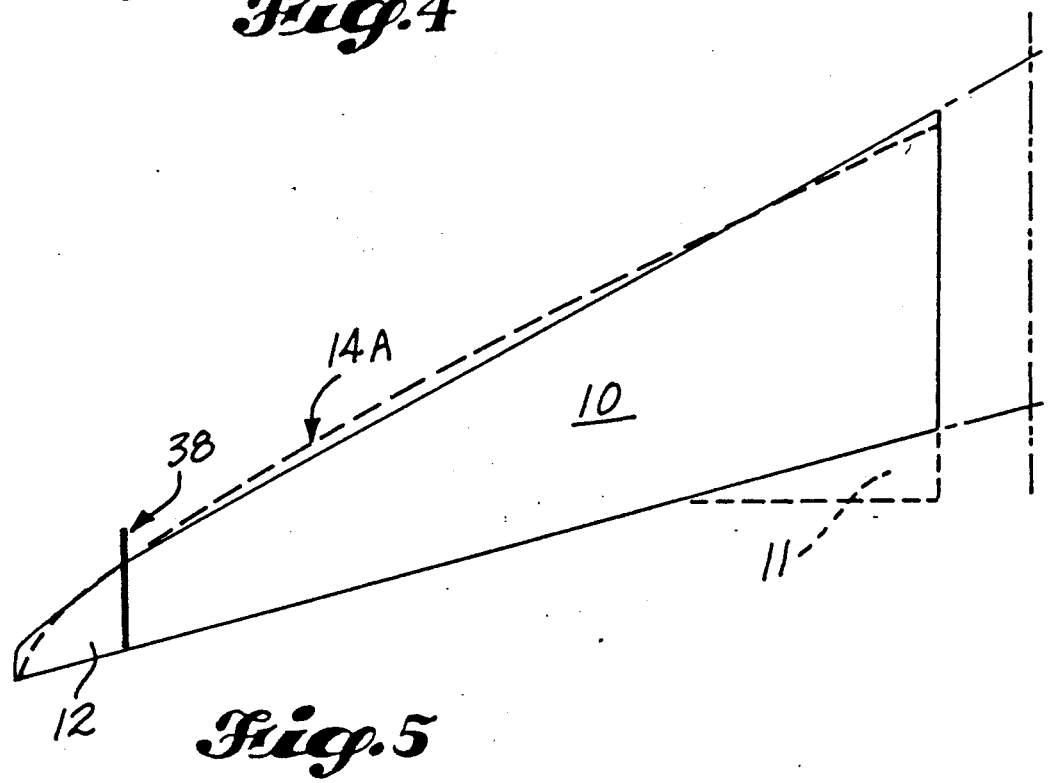
FIG. 5 is the same wing with a high taper tip extension member added and a superimposed elliptical lift distribution.

When a conventional tip extension is added this situation does not improve. The situation even gets worse when a constant chord extension member is added as much more unusable area is added. With a high taper tip extension (see FIG. 5), the wing planform shows less excess area over an ellipse. This means that the sectional lift coefficients are relatively uniform spanwise and the available wing chord is operating efficiently over most of the span.

The high taper tip extension member 12 of the present invention will generally add less of an aerodynamic lifting force to the outboard portion of the main wing 10 than would a constant chord extension member. This means that for a wing having a leading edge sweepback angle greater than twenty-seven degrees (27°), the high taper tip extension member 12 would produce less of a nose down pitching moment to the airplane during high speed cruise condition than would a constant chord extension member. This decrease in pitching moment would result in a reduction in tail down trim thus reducing airplane trim drag.

The high taper tip extension member 12 of the present invention has three more advantages at high speed; all three being structural aspects that make it preferable over conventional wing tip extension members. First, the short chords of the highly tapered tip extension members 12 are operating at a relatively high section lift coefficient. During maneuvers or gusts, the lift coefficient can only rise by a small amount to the stall lift coefficient. On a twisted wing with long tip chord operating at low section lift coefficients, the increase in lift coefficient to stall is much larger and the effected area larger. This means that the high taper tip extension member 12 produces much lower wing bending loads in maneuvers and gusts and therefore requires less strengthening of the existing wing box than would be required for a conventional constant chord tip extension.

The second beneficial structural aspect of the high taper wing tip extension member 12 comes from its higher sweep. The center of pressure of the tip extension 12 is aft of the neutral axis for torsion of the main wing 10. This aft load on the tip extension produces a moment that tends to twist the wing leading edge down at higher maneuver and gust loads, thus reducing incidence angle and lift coefficient. The high taper tip extension thus becomes its own gust and maneuver load alleviator.

The third benefit is a consequence of the second benefit. The alleviation of maneuver loads reduces the excitation moment for wing flutter. As a consequence, the high taper tip extension member is flutter proof.

The preceding comments on performance were confined to high speed operations, i.e. cruise, climb, and descent. However, the high taper wing tip extension member of the present invention also has beneficial effects at low speed operations, i.e., takeoff and landing.

For takeoff and landing, the added wing area of the extension member 12 increases the total wing lifting capability thus allowing for increased airplane gross weight without increasing takeoff and landing speeds. During takeoff, the decrease in drag or increase in lift-to-drag ratio provides improved performance, i.e., a further increase in takeoff weight.

However, for low speed operations there is a more important aspect to consider—low speed stall. Modern high-performance airplanes have leading edge devices to delay wing stall to higher angles of attack and increase the lift coefficient at stall. Adding a wing tip extension member will increase cost and weight if the tip extension must have a leading edge device, such as a slat. Therefore, the preferred high taper tip extension is one that reduces high speed cruise drag of the airplane and doesn't need high-lift devices for slow airspeed aerodynamic performance during landing and takeoffs.

The need for a leading edge device on a tip extension is not so much to avoid a lift loss due to stall of the extension, but to avoid (i) buffet preceding the stall, (ii) roll-off due to asymmetric stall of the extension, and (iii) pitch-up due to tip stall on a swept wing. A high taper wing tip extension member may not need a leading edge device if the span increase caused by the addition of the member 12 is kept low, as shown in FIGS. 3A and 6. The smaller extension member 12A of FIGS. 3A and 6 has a semispan increase of about half of the extension member shown in FIGS. 3 and 3B, or about six percent (6%) of semispan. For a larger high taper tip extension member 12, it is possible to increase the sweep of the leading and trailing edges (see member 12B in FIG. 3B) and eliminate the need for a leading edge device.

If the air flow over the smaller tip extension member 12A of FIGS. 3A and 6 separates prematurely at low speed, the buffet, roll-off, and pitch-up are moderate and acceptable. However, there is evidence that the small high taper wing tip extension member of FIGS. 3A and 6 may not lose lift during slow speed stall, i.e., a stable lifting force may be produced on said wing tip member up to angles of attack where the main wing stalls. This advantage is achievable if the small extension member 12A is provided with a high leading edge sweep of about fifty to sixty degrees (50° to 60°). With such sweep, a stable leading edge vortex, of the type found on highly swept delta wings, may be triggered on the upper surface of the small extension member 12A whereby lift may be retained up to high angles of attack, i.e., the stall, of the inboard main wing. A leading edge fence 38A, shown in FIG. 6, may also help trigger this leading edge vortex.

The highly tapered tip extension member 12B of FIG. 3B is designed with a sweep of about fifty to sixty degrees (50° to 60°) of the leading edge to produce the necessary leading edge vortex at low speed and high angles of attack of the airplane.

For high taper wing tip extension members with larger span increase and moderate leading edge sweep, i.e., greater than about forty degrees (40°) and less than about fifty degrees (50°), a leading edge device may be required. For example, FIG. 3 shows a tip extension member 12 having a conical slat 28. The member 12 of FIG. 3 provides about twelve percent (12%) increase in semispan of the main wing 10 and has a leading edge sweep of about forty degrees (40°).

FIGS. 7 and 8 show a hinged conical slat capable of conical motion. FIG. 7 is the plan view of a tip extension member 12A and shows a slat 28A in its deployed (solid) and stowed positions (dotted). The slat 28A has a hinge 39 at its outboard end. At approximately thirty percent (30%) outboard of its inboard end, the conical slat 28A is supported and actuated by a linkage system. This linkage system comprises a drive link 41 and a rotary actuator having drive lugs 49. The rotary actuator is tied into a drive system for actuating the slats of the basic main wing. As a result, the conical slats proximate the wing tips move in unison with the slats of the main wing.

FIG. 8 discloses a sectional view of the tip extension 12A at the drive link/actuator location and shows the slat 28A in a deployed (solid) and a stowed (dotted) position. The link 41 has a skewed axis and drives the slat 28A in a forward and downward direction. In the deployed position, the slat 28A forms an aerodynamic slot 51 with the fixed leading edge of the tip extension.

FIGS. 9 through 14 illustrate a second mechanism for deploying a conical slat 28 on the high taper tip extension 12. This second slat extension mechanism provides forward and down motion as well as a twenty degree (20°) droop. The plan view of the second slat arrangement shown in FIG. 9 is identical to the arrangements of FIGS. 1, 2 and 3. FIGS. 10 through 14 show cross-sectional views of the slat 28.

The slat 28 is supported and actuated by the second mechanism comprising an outboard conventional mono-ball pivot 40 and inboard and outboard track and roller support mechanisms. These mechanisms are positioned inboard of the pivot 40.

As more clearly shown in FIG. 11, the outboard slat actuation and extension mechanism comprises a curved slat support track 42 and a series of internal rollers 43 fixedly mounted to ribs and cantilevered forward of the front spar 21.

FIG. 13 shows the inboard slat actuation and extension mechanism. The slat 28 is connected to one end of a curved track 45 supported and guided at its other end through a series of internal rollers 46 fixedly mounted to ribs and cantilevered forward of the front spar 21. The curved track member 45 incorporates a rack gear segment 47 internally thereof as part of the extension/retraction mechanism. The rack gear segment 47 is arranged to engage a pinion or a sprocket drive gear 48 powered by a rotary actuator 49.

FIGS. 10 and 12 show the leading edge slat 28 of the tip extension member 12 at a forward extended operating position. An aerodynamic slot 50 is formed between the leading edge of the fixed wing and the trailing edge of the extended slat panel.

This slot 50 extends over the entire span of the tapered slat 28 and is tapered. It is interrupted only at the location of the track 42 and at the track 45, as shown in FIGS. 11 and 13 (see also FIG. 9). The actuator of the tip slat 28 is tied into the actuation system of the basic wing slats. As a consequence, the tip slats move in unison with the slats of the main wing.

The short tip chord of the tip extension member 12, assumed to be only little more than one foot for a typical commercial transport, leaves very little room for installation of navigation lights. There is always the option of placing some of the navigation lights on the fuselage. However, if the lights must be put on the wing tip special provisions have to be made because they will not fit into the small space of the tip airfoil.

FIGS. 1, 2, 3, 3A, 3B, and 9 show one approach to housing the navigation lights within a wing tip extension member of the present invention. A light pod 24 is attached to the outboard end of the tip extension box. The pod has a rounded rectangular cross section with aerodynamically faired leading and trailing edges and trails the wing tip. In its forward/outboard part the pod houses the red/green position lights and the anticollision strobes for the forward/side quadrant. The aft end houses the white position light and strobe lights for the aft/side quadrants.

FIG. 6 shows a simpler arrangement for the wing tip navigation lights. In this arrangement, the red/green position and forward/side strobe lights 23 are buried in the rounded transition between the main wing and the tip extension member 12A. The aft lights are in a small sting 25 disposed outboard and aft of the aileron 33.

A high taper wing tip extension member of the present invention is not only useful as an add-on to existing lower aspect ratio wings, but also offers advantages in the design of wings of new airplanes. FIG. 15 shows a wing planform for a future high technology airplane wherein the wing has a high aspect ratio (10.5). Wing leading edge sweep is about twenty-seven degrees (27°), tip chord is slightly over fifty inches (50") and there are five leading edge slats 27A and 28A per side. The aileron 35A is not at the very tip but is moved slightly inboard.

The aerodynamic performance of this wing can be improved, without changing its span, by providing it with a high taper wing tip 12C, as shown in FIG. 16. The short tip chord of about fifteen inches (15") is faired into the existing wing leading edge near the outboard edge of the aileron 35B to form the high taper tip 12C. The outboard slat 28A of FIG. 15 is deleted and four inboard slats 27B are made slightly larger than the slats 27A of FIG. 15 to cover the leading edge out to the outboard edge of the aileron 35B.

Advantages derived from an incorporation of the wing tip 12C include a reduction in skin friction drag due to reduced wing area, a decrease in induced drag due to a closer approximation of the lift distribution to the ideal elliptical shape, and increased aspect ratio. Side benefits are in the structural area with lower wing bending loads due to gusts or maneuvers, load alleviation due to aeroelastic effects from the aft center of pressure on the highly swept tip, and lower susceptibility to flutter. There is also a cost and weight advantage resulting from the decrease in wing area and the elimination of one slat per side.

What is claimed and desired to be secured by Letters Patent of the U.S. is:

1. Apparatus for improving the aerodynamic performance of an aircraft capable of attaining but not exceeding high transonic speeds, said aircraft having a tapered planform, geometrically twisted, main wing, said main wing having a leading edge sweepback angle greater than about twenty-seven degrees (27°) and less than about forty degrees (40°), said apparatus comprising a tapered wing tip member adapted to be secured to each outboard end of said main wing, said main wing and said wing tip member having a spanwise lift distribution approximating that of an elliptical planform wing, said wing tip member having a chordplane projecting outwardly in spanwise alignment with the chordplane of said main wing, and wherein said wing tip member has a leading edge sweepback angle of about forty degrees (40°) or more.

2. The apparatus of claim 1, wherein the span of each wing tip member is about six percent (6%) of the semispan of said main wing, each wing tip member having a leading edge sweepback angle between fifty degrees (50°) and sixty degrees (60°) and a trailing edge in alignment with the trailing edge of said main wing, whereby when said aircraft is operating at low speeds and high angles of attack, the high leading edge sweep of said wing tip member triggers the formation of a stable leading edge vortex on the upper surface of said wing tip member thereby producing a stable lifting force on said wing tip member up to angles of attack where the main wing stalls.

3. The apparatus of claim 2, wherein said wing tip member has a center of pressure further aft of the neutral axis for torsion of said main wing, whereby when said aircraft experiences a gust at high speed cruise conditions above Mach 0.7, said wing tip member produces a moment that aeroelastically twist said main wing to unload and decrease main wing bending moments.

4. The apparatus of claim 2, wherein a leading edge fence is positioned between the outboard end and the inboard end of the upper surface of each wing tip member for aiding in the triggering of the formation of said leading edge vortex on said wing tip member.

5. The apparatus of claim 3, wherein each wing tip member has a center of pressure further aft of the neutral axis for torsion of said main wing, whereby when said aircraft experiences a gust at high speed cruise conditions above Mach 0.7, said wing tip member produces a moment that aeroelastically twists said main wing to unload and decrease main wing bending moments.

6. The apparatus of claim 1, wherein the span of each wing tip member is about twelve percent (12%) of the semispan of said main wing, said wing tip member having a leading edge sweepback angle between about fifty degrees (50°) and sixty degrees (60°) and a trailing edge sweepback angle greater than the sweepback angle of the trailing edge of said main wing, whereby when said aircraft is operating at low speeds and high angles of attack, such high leading edge sweep of said wing tip member may trigger a stable leading edge vortex on the upper surface of said wing tip member thereby producing a stable lifting force on said wing tip member up to angles of attack where the main wing stalls.

7. The apparatus of claim 6, wherein each wing tip member has a center of pressure further aft of the neutral axis for torsion of said main wing, whereby when said aircraft experiences a gust at high speed cruise conditions above Mach 0.7, said wing tip member produces a moment that aeroelastically twist said main wing to unload and decrease main wing bending moments.

8. The apparatus of claim 1, wherein the span of each wing tip member is about twelve percent (12%) of the semispan of said main wing, said wing tip member having a leading edge sweepback angle between about forty degrees (40°) and fifty degrees (50°) and a trailing edge sweepback angle equal to the sweepback angle of the trailing edge of said main wing, each wing tip member being provided with a leading edge high-lift means capable of increasing lift coefficients on each wing tip member during takeoff and landing operations of said aircraft.

9. The apparatus of claim 8, wherein each wing tip member has a center of pressure further aft of the neutral axis for torsion of said main wing, whereby when said aircraft experiences a gust at high speed cruise conditions above Mach 0.7, said wing tip member produces a moment that aeroelastically twist said main wing to unload and decrease main wing bending moments.

10. The apparatus of claim 8, wherein the leading edge of said main wing has extendable high-lift devices for increasing wing lift coefficients during takeoff and landing of said aircraft, said wing tip member high-lift means being mounted spanwise along the leading edge of said wing tip member and being tapered in planform with its chord length decreasing in a spanwise outboard direction, said wing tip member high-lift means being forwardly extendable in unison with said main wing high-lift devices for forming a substantially continuous leading edge therewith, said wing tip member and its high-lift means increasing the overall wing lift capability of said aircraft at slow airspeeds.

11. The apparatus of claim 10, wherein the spanwise outboard end of said wing tip member high-lift means is pivotally mounted to the spanwise outboard end of said wing tip member, and further comprising actuation means for rotatably extending said wing tip member high-lift means forwardly and downwardly about its pivotally mounted outboard end, whereby the leading edge sweepback angle of said wing tip member high-lift means is increased during forward extension thereof.

12. The apparatus of claim 11, wherein said actuation means is interconnected with the actuation system for said main wing leading edge high-lift devices, whereby the inboard end of said wing tip member high-lift means may be extended in unison with said main wing leading edge high-lift devices to a position adjacent to an extended outboard high-lift device on said main wing thereby forming a substantially continuous leading edge with the leading edge of said main wing high-lift device.

13. The apparatus of claim 10, wherein a spanwise varying aerodynamic slot opening is formed during forward extension of said wing tip member high-lift means.

14. Apparatus for improving high transonic speed aircraft, the main wing of said aircraft being tapered in planform and having a leading edge sweepback angle greater than about twenty-seven degrees (27°), said main wing being provided with a leading edge incorporating extendable high-lift devices to increase wing lift coefficients for takeoff and landing operation of said aircraft, said apparatus comprising a high taper wing tip member adapted to be secured to the outboard end of said main wing, said wing tip member having a chordplane projecting outwardly in spanwise alignment with the main wing chordplane, a high-lift device mounted spanwise along the leading edge of said wing tip member and being tapered in planform with its chord length decreasing in a spanwise outboard direction, said wing tip member high-lift device being forwardly extendable in unison with said main wing high-lift devices for forming a substantially continuous leading edge therewith, said wing tip member and its leading edge device increasing the overall wing lift capability of said aircraft at slow airspeeds.

15. The combination of claim 14, wherein said high taper wing tip member and its leading edge device increases the lift-to-drag ratio of said main wing thereby allowing for higher takeoff weight.

16. The combination of claim 14, wherein the spanwise outboard end of said wing tip member leading edge device is pivotally mounted to the spanwise outboard end of said wing tip member, and further comprising actuation means for rotatably extending said wing tip member leading edge device forwardly and downwardly about its pivotally mounted outboard end, whereby the leading edge sweepback angle of said wing tip member leading edge device is increased during forward extension thereof.

17. The combination of claim 16, wherein said actuation means is interconnected with the actuation system for said main wing leading edge high-lift devices, whereby the inboard end of said wing tip member leading edge device may be extended in unison with said main wing leading edge high-lift devices to a position adjacent to an extended outboard high-lift device on said main wing thereby forming a substantially continuous leading edge with the leading edge of said main wing high-lift device.

18. The combination of claim 16, wherein a spanwise varying aerodynamic slot opening is formed during forward extension of said wing tip member leading edge device relative to the fixed portion of said wing tip member, said slot opening decreasing in a spanwise outboard direction.

19. Apparatus for improving the aerodynamic performance of an aircraft capable of attaining high transonic speeds, the main wing of said aircraft being tapered in planform, said main wing having a leading edge sweepback angle greater than about twenty-seven degrees (27°) and leading edge high-lift means for increasing the lift coefficient of said main wing during takeoff and landing, said apparatus comprising a high taper wing tip member adapted to be secured to each outboard end of said main wing, each wing tip member having a chordplane projecting outwardly in spanwise alignment with the chordplane of said main wing, said wing tip member having a leading edge sweepback angle greater than that of said main wing, and a leading edge fence positioned between the outboard and the inboard end of said wing tip member for triggering the formation of a leading edge vortex on said wing tip member when said main wing is at a high angle of attack and during slow flight airspeed of said aircraft, said wing tip member leading edge maintaining said triggered vortex airflow circulation along the upper surface of said wing tip member and producing a stable lifting force over the upper surface thereof.

20. The apparatus of claim 19, wherein the sweepback angle of the leading edge of said wing tip member is greater than about fifty degrees (50°).

21. A high taper wing tip member adapted to be secured to the outboard end of a tapered in planform main wing on a high transonic speed aircraft, said main wing having a leading edge sweepback angle greater than about twenty-seven degrees (27°) and having leading edge high-lift devices to increase wing lift coefficients during takeoff and landing, said wing tip member having a chordplane projecting outwardly in spanwise alignment with the chordplane of said main wing, said wing tip member having a leading edge high-lift mechanism which extends forwardly in unison with said high-lift devices to increase the overall wing lift coefficients for preventing premature stall of said wing tip member at slow airspeed and high angle of attack, such as encountered during takeoff and landing, said wing tip member high-lift mechanism being tapered in planform with its chord length decreasing in a spanwise outboard direction, said tapered mechanism having its outboard end pivotally mounted to the spanwise outboard end of said wing tip member for forward and downward extension movement, actuation means connected to the inboard end of said tapered mechanism for rotatably extending said tapered mechanism about its pivotably mounted outboard end and increasing the leading edge sweepback angle of said tapered mechanism during forward extension thereof.

22. The combination of claim 21, wherein said actuation means for said tapered mechanism is interconnected with the actuation system for said high-lift devices, whereby the inboard end of said tapered mechanism may be moved in unison with high-lift devices to a position adjacent to an extended outboard high-lift device on said main wing thereby forming a substantially continuous leading edge with the leading edge of said high-lift devices.

23. The combination of claim 21, wherein a spanwise varying aerodynamic slot opening is formed during forward extension of said tapered mechanism relative to the fixed portion of said wing tip member, whereby said slot opening decreases in a spanwise outboard direction.

24. Apparatus for improving the aerodynamic performance of an aircraft capable of attaining high transonic speeds, said aircraft having a tapered planform, geometrically twisted, main wing; said main wing having a leading edge sweepback angle greater than about twenty-seven degrees (27°); said apparatus comprising a tapered wing tip member adapted to be secured to each outboard end of said main wing; said main wing and said wing tip member having a spanwise lift distribution approximating that of an elliptical planform wing; said wing tip member having a chordplane projecting outwardly in spanwise alignment with the chordplane of said main wing; each wing tip member having a span about six percent (6%) of the semispan of said main wing; each wing tip member having a leading edge sweepback angle between fifty degrees (50°) and sixty degrees (60°) and a trailing edge in alignment with the trailing edge of said main wing, whereby when said aircraft is operating at low speeds and high angles of attack, the high leading edge sweep of said wing tip member triggers the formation of a stable leading edge vortex on the upper surface of said wing tip member thereby producing a stable lifting force on said wing tip member up to angles of attack where the main wing stalls, and a leading edge fence positioned between the outboard end and the inboard end of the upper surface of each wing tip member for aiding in the triggering of the formation of said leading edge vortex on said wing tip member.

25. Apparatus for improving the aerodynamic performance of an aircarft capable of attaining high transonic speeds; said aircraft having a tapered planform, geometrically twisted, main wing; said main wing having a leading edge sweepback angle greater than about twenty-seven degrees ( 27°); said apparatus comprising a tapered wing tip member adapted to be secured to each outboard end of said main wing; said main wing and said wing tip member having a spanwise lift distribution approximating that of an elliptical planform wing; said wing tip member having a chordplane projecting outwardly in spanwise alignment with the chordplane of said main wing; each wing tip member having a span about six percent (6%) of the semispan of said main wing; each wing tip member having a leading edge sweepback angle between fifty degrees (50°) and sixty degrees (60°) and a trailing edge in alignment with the trailing edge of said main wing, whereby when said aircraft is operating at low speeds and high angles of attack, the high leading edge sweep of said wing tip member triggers the formation of a stable leading edge vortex on the upper surface of said wing tip member thereby producing a stable lifting force on said wing tip member up to angles of attack where the main wing stalls; each wing tip member having a center of pressure further aft of the neutral axis for torsion of said main wing, whereby when said aircraft experiences a gust at high speed cruise conditions above Mach 0.7, said wing tip member produces a moment that aeroelastically twists said main wing to unload and decrease main wing bending moments, and a leading edge fence positioned between the outboard end and the inboard end of the upper surface of each wing tip member for aiding in the triggering of the formation of said leading edge vortex on said wing tip member.

26. Apparatus for improving the aerodynamic performance of an aircraft capable of attaining high transonic speeds; said aircraft having a tapered planform, geometrically twisted, main wing; said main wing having a leading edge sweepback angle greater than about twenty-seven degrees (27°); said apparatus comprising a tapered wing tip member adapted to be secured to each outboard end of said main wing; said main wing and said wing tip member having a spanwise lift distribution approximating that of an elliptical planform wing; said wing tip member having a chordplane projecting outwardly in spanwise alignment with the chordplane of said main wing; each wing tip member having a span about twelve percent (12%) of the semispan of said main wing; said wing tip member having a leading edge sweepback angle between about forty degrees (40°) and fifty degrees (50°) and a trailing edge sweepback angle equal to the sweepback angle of the trailing edge of said main wing; each wing tip member being provided with a leading edge high-lift means capable of increasing lift coefficients one each wing tip member during takeoff and landing operations of said aircraft; said wing tip member high-lift means being mounted spanwise along the leading edge of said wing tip member and being tapered in planform with its chord length decreasing in a spanwise outboard direction, and wherein the leading edge of said main wing has extendable high-lift devices for increasing wing lift coefficients during takeoff and landing of said aircraft; said wing tip member high-lift means being forwardly extendable in unison with said main wing high-lift devices for forming a substantially continuous leading edge therewith, said wing tip member and its high-lift means increasing the overall wing lift capability of said aircraft at slow airspeeds.

27. Apparatus for improving the aerodynamic performance of an aircraft capable of attaining high transonic speeds; said aircraft having a tapered planform, geometrically twisted, main wing; said main wing having a leading edge sweepback angle greater than about twenty-seven degrees (27°); said apparatus comprising a tapered wing tip member adapted to be secured to each outboard end of said main wing; said main wing and said wing tip member having a spanwise lift distribution approximating that of an elliptical planform wing; said wing tip member having a chordplane projecting outwardly in spanwise alignment with the chordplane of said main wing; each wing tip member having a span about twelve percent (12%) of the semispan of said main wing; said wing tip member having a leading edge sweepback angle between about forty degrees (40°) and fifty degrees (50°) and a trailing edge sweepback angle equal to the sweepback angle of the trailing edge of said main wing; each wing tip member being provided with a leading edge high-lift means capable of increasing lift coefficients on each wing tip member during takeoff and landing operations of said aircraft; said wing tip member high-lift means being mounted spanwise along the leading edge of said wing tip member and being tapered in planform with its chord length decreasing in a spanwise outboard direction; the spanwise outboard end of said wing tip member high-lift means being pivotally mounted to the spanwise outboard end of said wing tip member; actuation means for rotatably extending said wing tip member high-lift means forwardly and downwardly about its pivotally mounted outboard end, whereby the leading edge sweepback angle of said wing tip member high-lift means is increased during forward extension thereof, and wherein the leading edge of said main wing has extendable high-lift devices for increasing wing lift coefficients during takeoff and landing of said aircraft; said wing tip member high-lift means being forwardly extendable in unison with said main wing high-lift devices for forming a substantially continuous leading edge therewith, said wing tip member and its high-lift means increasing the overall wing lift capability of said aircraft at slow airspeeds.

28. Apparatus for improving the aerodynamic performance of an aircraft capable of attaining high/transonic speeds; said aircraft having a tapered planform, geometrically twisted, main wing; said main wing having a leading edge sweepback angle greater than about twenty-seven degrees (27°); said apparatus comprising a tapered wing tip member adapted to be secured to each outboard end of said main wing; said main wing and said wing tip member having a spanwise lift distribution approximating that of an elliptical planform wing; said wing tip member having a chordplane projecting outwardly in spanwise alignment with the chordplane of said main wing; each wing tip member having a span about twelve percent (12%) of the semispan of said main wing; said wing tip member having a leading edge sweepback angle between about forty degrees (40°) and fifty degrees (50°) and a trailing edge sweepback angle equal to the sweepback angle of the trailing edge of said main wing; each wing tip member being provided with a leading edge high-lift means capable of increasing lift coefficients on each wing tip member during takeoff and landing operations of said aircraft; said wing tip member high-lift means being mounted spanwise along the leading edge of said wing tip member and being tapered in planform with its chord length decreasing in a spanwise outboard direction; the spanwise outboard end of said wing tip member high-lift means being pivotally mounted to the spanwise outboard end of said wing tip member; actuation means for rotatably extending said wing tip member high-lift means forwardly and downwardly about its pivotally mounted outboard end, whereby the leading edge sweepback angle of said wing tip member high-lift means is increased during forward extension thereof, said wing tip member and its high-lift means increasing the overall wing lift capability of said aircraft at slow airspeeds, and wherein the leading edge of said main wing has extendable high-lift devices for increasing wing lift coefficients during takeoff and landing of said aircraft; said actuation means being interconnected with the actuation system for said main wing leading edge high-lift devices whereby said wing tip member high-lift means may be forwardly extended in unison with said main wing high-lift devices and form a substantially continuous leading edge therewith.

29. Apparatus for improving the aerodynamic performance of an aircraft capable of attaining high transonic speeds; said aircraft having a tapered planform, geometrically twisted, main wing; said main wing having a leading edge sweepback angle greater than about twenty-seven degrees (27°); said apparatus comprising a tapered wing tip member adapted to be secured to each outboard end of said main wing; said main wing and said wing tip member having a spanwise lift distribution approximating that of an elliptical planform wing; said wing tip member having a chordplane projecting outwardly in spanwise alignment with the chordplane of said main wing; each wing tip member having a span about twelve percent (12%) of the semispan of said main wing; said wing tip member having a leading edge sweepback angle between about forty degrees (40°) and fifty degrees (50°) and a trailing edge sweepback angle equal to the sweepback angle of the trailing edge of said main wing; each wing tip member being provided with a leading edge high-lift means capable of increasing lift coefficients on each wing tip member during takeoff and landing operations of said aircraft; said wing tip member high-lift means being mounted spanwise along the leading edge of said wing tip member and tapered in planform with its chord length decreasing in a spanwise outboard direction, and forming a spanwise varying aerodynamic slot opening when forwardly extended, and wherein the leading edge of said main wing has extendable high-lift devices for increasing wing lift coefficients during takeoff and landing of said aircraft; said wing tip member high-lift means being forwardly extendable in unison with said main wing high-lift devices for forming a substantially continuous leading edge therewith.

* * * * *